(12) United States Patent
Jung et al.

(10) Patent No.: US 11,042,405 B2
(45) Date of Patent: Jun. 22, 2021

(54) SCHEDULING AND EXECUTING FUNCTIONS ACROSS DIFFERENT FUNCTIONS-AS-A-SERVICE (FAAS) INFRASTRUCTURES

(71) Applicant: VMware, Inc., Palo Alto, CA (US)

(72) Inventors: Berndt Jung, Redwood City, CA (US); Mark Peek, Belmont, CA (US); Xueyang Hu, Sunnyvale, CA (US); Ivan Mikushin, San Jose, CA (US); Karol Stepniewski, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 198 days.

(21) Appl. No.: 16/245,055

(22) Filed: Jan. 10, 2019

(65) Prior Publication Data
US 2020/0225983 A1 Jul. 16, 2020

(51) Int. Cl.
*G06F 9/46* (2006.01)
*G06F 9/48* (2006.01)
*G06F 9/54* (2006.01)
*H04L 29/08* (2006.01)
*G06F 9/50* (2006.01)
*G06F 16/907* (2019.01)

(52) U.S. Cl.
CPC .......... *G06F 9/4881* (2013.01); *G06F 9/5005* (2013.01); *G06F 9/541* (2013.01); *G06F 16/907* (2019.01); *H04L 67/1097* (2013.01)

(58) Field of Classification Search
CPC .............................. G06F 9/4881; G06F 16/907
See application file for complete search history.

(56) References Cited

U.S. PATENT DOCUMENTS

| | | | |
|---|---|---|---|
| 10,921,872 B2 * | 2/2021 | Gendler | G06F 1/324 |
| 2004/0158824 A1 * | 8/2004 | Gennip | G06F 8/41 717/140 |
| 2013/0073732 A1 * | 3/2013 | Vicat-Blanc-Primet | H04L 47/826 709/226 |
| 2016/0248859 A1 * | 8/2016 | Jacquenet | H04L 41/0816 |

* cited by examiner

*Primary Examiner* — Camquy Truong
(74) *Attorney, Agent, or Firm* — Fountainhead Law Group P.C.

(57) ABSTRACT

Techniques for scheduling and executing functions across a plurality of different Functions-as-a-Service (FaaS) infrastructures are provided. In one set of embodiments, a computer system can determine that a function has been invoked, where the computer system implements a spanning FaaS service platform that is communicatively coupled with the plurality of different FaaS infrastructures. In response, the computer system can retrieve metadata associated with the function, where the metadata includes criteria or policies indicating how the function should be scheduled for execution, and can retrieve information associated with each of the plurality of different FaaS infrastructures, where the information includes capabilities or characteristics of each FaaS infrastructure. The computer system can then select a FaaS infrastructure in the plurality of different FaaS infrastructures based on the retrieved metadata and the retrieved information and can schedule the function for execution on the selected FaaS infrastructure.

21 Claims, 4 Drawing Sheets

SCHEDULING AND EXECUTING FUNCTIONS ACROSS DIFFERENT FUNCTIONS-AS-A-SERVICE (FAAS) INFRASTRUCTURES

BACKGROUND

Functions-as-a-service (FaaS) is a computing model in which application developers upload modular chunks of application functionality, referred to as functions, to a cloud-based FaaS infrastructure. Once uploaded, a service layer of the FaaS infrastructure schedules and executes the functions on-demand (e.g., at the time of function invocation) on servers (i.e., hosts) of the infrastructure in an independent and scalable manner.

FaaS can be implemented using private clouds or public clouds. Generally speaking, a private cloud-based FaaS infrastructure is owned and operated by a single organization (using, e.g., the organization's on-premise server resources) for sole use by that organization. In contrast, a public cloud-based FaaS infrastructure is owned and operated by a third-party FaaS provider and is made available for use by various customers (e.g., organizations, application developers, etc.). Since the customers are not responsible for operating/managing the server hardware of a public cloud-based infrastructure, this is sometimes refers to as a "serverless" solution. Most third-party FaaS providers charge customers for their use of the public cloud infrastructure via a consumption-based billing model (i.e., a model that charges per function invocation, per unit of function execution time, or based on some other resource consumption metric).

Like any production application, applications that are built using functions running on a FaaS infrastructure may have requirements regarding availability, performance, and scalability. These requirements can be difficult to meet on a strictly consistent basis if the public or private cloud backing the FaaS infrastructure experiences transient problems such as network congestion, excessive server load, hardware failures, power outages, and so on. These problems can be particularly acute for private clouds, since scalability is often limited due to pre-allocation of hardware resources and server availability/disaster recovery is often limited due to the use of a single or a few on-premise data centers.

SUMMARY

Techniques for scheduling and executing functions across a plurality of different Functions-as-a-Service (FaaS) infrastructures are provided. In one set of embodiments, a computer system can determine that a function has been invoked, where the computer system implements a spanning FaaS service platform that is communicatively coupled with the plurality of different FaaS infrastructures. In response, the computer system can retrieve metadata associated with the function, where the metadata includes criteria or policies indicating how the function should be scheduled for execution, and can retrieve information associated with each of the plurality of different FaaS infrastructures, where the information includes capabilities or characteristics of each FaaS infrastructure. The computer system can then select a FaaS infrastructure in the plurality of different FaaS infrastructures based on the retrieved metadata and the retrieved information and can schedule the function for execution on the selected FaaS infrastructure.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof 1. Overview Embodiments of the present disclosure are directed to a FaaS service platform (referred to herein as "spanning FaaS") that can schedule and execute functions across a plurality of different private cloud or public cloud-based FaaS infrastructures which are registered with the platform. For example, at a time a particular function is invoked, the spanning FaaS service platform can evaluate characteristics of the registered FaaS infrastructures and can select a particular infrastructure that is best suited for executing the function. In various embodiments, the spanning FaaS service platform can make this selection based on criteria/policies that are associated with the function itself and/or are defined at a higher level (e.g., application-level, deployment-level, etc.). The spanning FaaS service platform can then schedule execution of the function on the selected FaaS infrastructure.

With this general approach, the scalability and availability issues that often arise when relying on a single private cloud-based FaaS infrastructure for function execution can be mitigated or avoided. For instance, the spanning FaaS service platform can offload the execution of functions from the private cloud-based FaaS infrastructure to one or more public cloud-based FaaS infrastructures in response to resource capacity/availability constraints that appear in the private cloud, and this offloading can continue until the on-premise constraints are lifted or resolved.

In addition, the spanning FaaS service platform can enable new types of FaaS use cases with concomitant new benefits that were not possible before using conventional silo-ed FaaS implementations, such as dynamically scheduling function execution across different FaaS infrastructures in a manner that results in lowest monetary cost, highest performance, and so on. These and other aspects of the present disclosure are described in further detail below.

2. Platform Architecture

Figure 1:
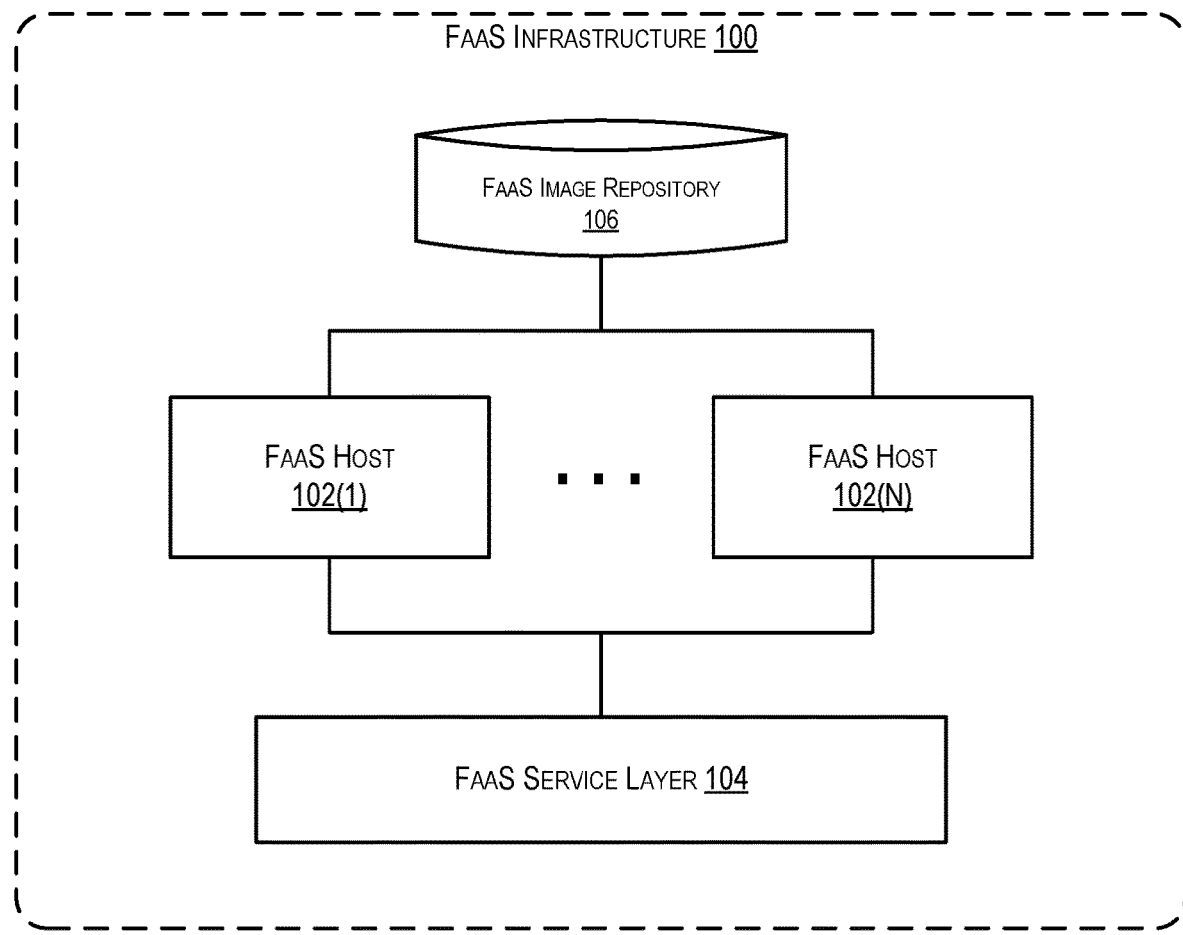
FIG. 1 depicts a conventional FaaS infrastructure.

To provide context for the embodiments described herein, FIG. 1 is a simplified block diagram of a single conventional FaaS infrastructure 100. As shown FaaS infrastructure 100 includes a plurality of FaaS hosts 102(1)-(N) that are communicatively coupled with a FaaS service layer 104 and a FaaS image repository 106. In one set of embodiments, FaaS infrastructure 100 may be a private cloud-based infrastructure and thus the hardware resources (e.g., compute, storage, etc.) underlying components 102(1)-(N), 104, and 106 may be part of an on-premise resource pool (i.e., private cloud) operated and managed by a particular organization for the sole use of that organization. In other embodiments, FaaS infrastructure 100 may be a public cloud-based infrastructure and thus the hardware resources underlying components 102(1)-(N), 104, and 106 may be part of a publically-accessible resource pool (i.e., public cloud) operated and managed by a third-party FaaS provider for use by various customers. Examples of well-known public cloud-based FaaS infrastructures include Amazon AWS Lambda, Microsoft Azure Functions, and Google Cloud Functions.

In practice, application developers that wish to leverage FaaS infrastructure 100 can create and upload functions to infrastructure 100 that correspond to modular portions of functionality in their applications. For example, one such function may encapsulate program code for extracting data from a file, another such function may encapsulate program code for processing the extracted data in a certain way, and so on. These functions are maintained by FaaS infrastructure 100 in the form of function runtime images (which may be, e.g., executable files, container images, virtual machine images, etc.) in FaaS image repository 106.

When an application that makes use of an uploaded function is run, a scheduling component of FaaS service layer 104 (not shown) can receive an invocation request for that function and can select one of FaaS hosts 102(1)-(N) for executing the function. The selected FaaS host can then retrieve the image for the invoked function from FaaS image repository 106, load/initialize the function image in its primary memory (thereby creating an instance of the function in the primary memory), and execute the function instance.

Significantly, FaaS service layer 104 cannot schedule the invoked function for execution on a host of another FaaS infrastructure that is different from infrastructure 100. For example, if FaaS infrastructure 100 is a private cloud-based infrastructure, FaaS service layer 104 cannot schedule the invoked function for execution on a public cloud-based FaaS infrastructure. Similarly, if FaaS infrastructure 100 corresponds to one type of public cloud-based infrastructure (e.g., Amazon AWS Lambda), FaaS service layer 104 cannot schedule the invoked function for execution of a different type of public cloud-based FaaS infrastructure (e.g., Microsoft Azure Functions). This is because the various components of FaaS infrastructure 100 are part of a self-contained system and are solely designed to interoperate with each other.

Figure 2:
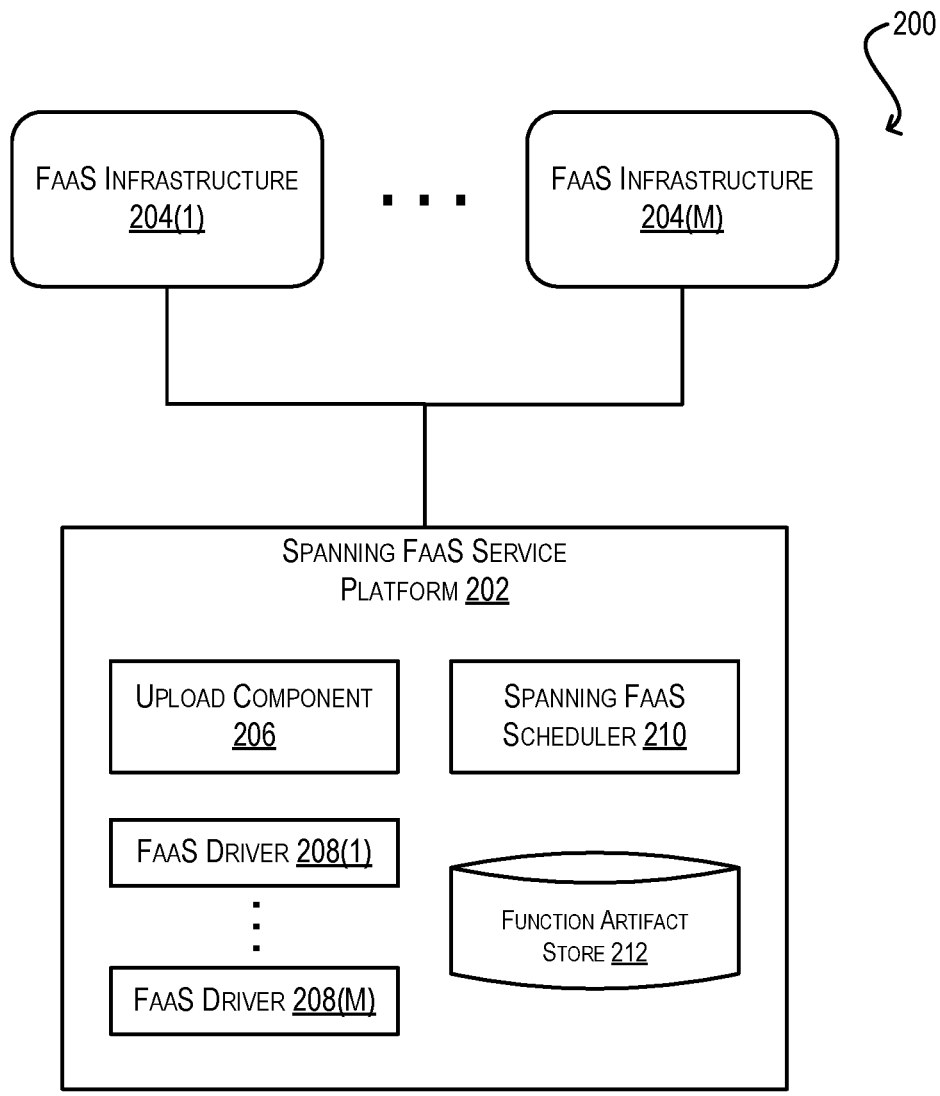
FIG. 2 depicts a spanning FaaS service platform according to an embodiment.

To address this limitation, FIG. 2 depicts a novel architecture 200 that supports the scheduling and execution of functions across multiple different FaaS infrastructures according to an embodiment. As shown in FIG. 2, architecture 200 includes a spanning FaaS service platform 202 that is communicatively coupled with a plurality of disparate FaaS infrastructures 204(1)-(M) which have been registered with platform 202. Each FaaS infrastructure 204 may be implemented in accordance with infrastructure 100 of FIG. 1 and may correspond to a private cloud or public cloud-based infrastructure. For instance, FaaS infrastructure 204(1) may be a private cloud-based infrastructure, FaaS infrastructure 204(2) may be Amazon AWS Lambda, FaaS infrastructure 204(3) may be Microsoft Azure Functions, FaaS infrastructure 204(4) may be Google Cloud Functions, and so on.

Spanning FaaS service platform 202 comprises an upload component 206, a plurality of FaaS drivers 208(1)-(M), a spanning FaaS scheduler 210, and a function artifact store 212. Each FaaS driver 208 maps to a registered FaaS infrastructure 204 and includes information that spanning FaaS service platform 202 can use to communicate with FaaS infrastructure 204, as well as information that specifies capabilities, characteristics, and/or other metadata regarding the infrastructure. For example, each FaaS driver 208 can include login/connection information for connecting to the corresponding FaaS infrastructure via one or more accounts, a listing of application programming interfaces (APIs) exposed by the service layer of the FaaS infrastructure for creating and executing functions, hardware capabilities and/or specific types of hardware devices supported by the hosts of the FaaS infrastructure, details of the infrastructure's billing model, etc.

As described in further detail below, at a time an application developer wishes to upload a new function to one or more of FaaS infrastructures 204(1)-(M), the developer can submit the function (in the form of a package of files referred to as a function artifact) via upload component 206 to spanning FaaS service platform 202, rather than directly to FaaS infrastructures 204(1)-(M). In various embodiments, the function artifact can include the code for the function, software dependencies that the function relies on, and metadata that defines criteria, constraints, policies, tags, and/or other information for governing the scheduling and execution of the function. The specific format and content of this metadata can be specified by the administrators of spanning FaaS service platform 202.

In response to receiving the function artifact, upload component 206 can store the function artifact (or a portion thereof) in function artifact store 212 and can invoke an appropriate API of each registered FaaS infrastructure 204 (as determined from the corresponding FaaS driver 208) to "create" the function in that infrastructure. This step results in the generation of a function runtime image for the function in the FaaS image repository of each FaaS infrastructure 204.

Then, when the function is subsequently invoked, spanning FaaS scheduler 210 can receive the invocation request (or detect an event that triggers the invocation) and can select, based on the information included in the function metadata and the information included in FaaS drivers 208(1)-(M), one of FaaS infrastructures 204(1)-(M) as being the "best" infrastructure for executing the function at that point in time. For example, if the function metadata includes a tag that indicates the function runs best on hosts that incorporate a dedicated graphics processing unit (GPU), spanning FaaS scheduler 210 may select a FaaS infrastructure 204 whose hosts include this type of hardware (per the metadata in FaaS drivers 208(1)-(M)). As another example, if the function metadata specifies a policy that states all instances of the function should be scheduled/executed on a private cloud-based FaaS infrastructure up to a certain capacity limit and then offloaded to a public cloud-based FaaS infrastructure, spanning FaaS scheduler 210 can perform its selection in accordance with this policy.

Finally, spanning FaaS scheduler 210 can schedule the function for execution on the selected FaaS infrastructure by, e.g., calling an appropriate "execute function" API of the infrastructure as defined in its FaaS driver.

With the spanning FaaS architecture of FIG. 2, a number of advantages can be achieved over existing FaaS implementations, which are essentially "silo-ed" in nature (i.e., each FaaS infrastructure is isolated from and independent of each other). For instance, in cases where an organization deploys a private cloud-based FaaS infrastructure for its applications/functions, the organization can use architecture 200 to dynamically offload function execution as-needed to one or more public cloud-based FaaS infrastructures and thereby overcome the scalability and availability issues that are common in private clouds.

Further, architecture 200 allows application developers to leverage the strengths of different FaaS infrastructures to optimize the developers' applications along various dimensions on a per-function execution basis, which simply was not possible before. For instance, an application developer may define a criterion or policy that ensures a given function is always executed on a FaaS infrastructure that has the lowest monetary cost, provides the fastest performance, has the best data locality, has the least latency, etc. at the time of the function is called.

Yet further, architecture 200 can achieve the foregoing advantages without requiring application developers to create and upload multiple function artifacts for a given function to multiple different FaaS infrastructures. Instead, an application developer can upload a single function artifact with the appropriate metadata to spanning FaaS service platform 202, and platform 202 can take the steps needed to create and execute the function on each of registered FaaS infrastructures 204(1)-(M).

Figure 3:
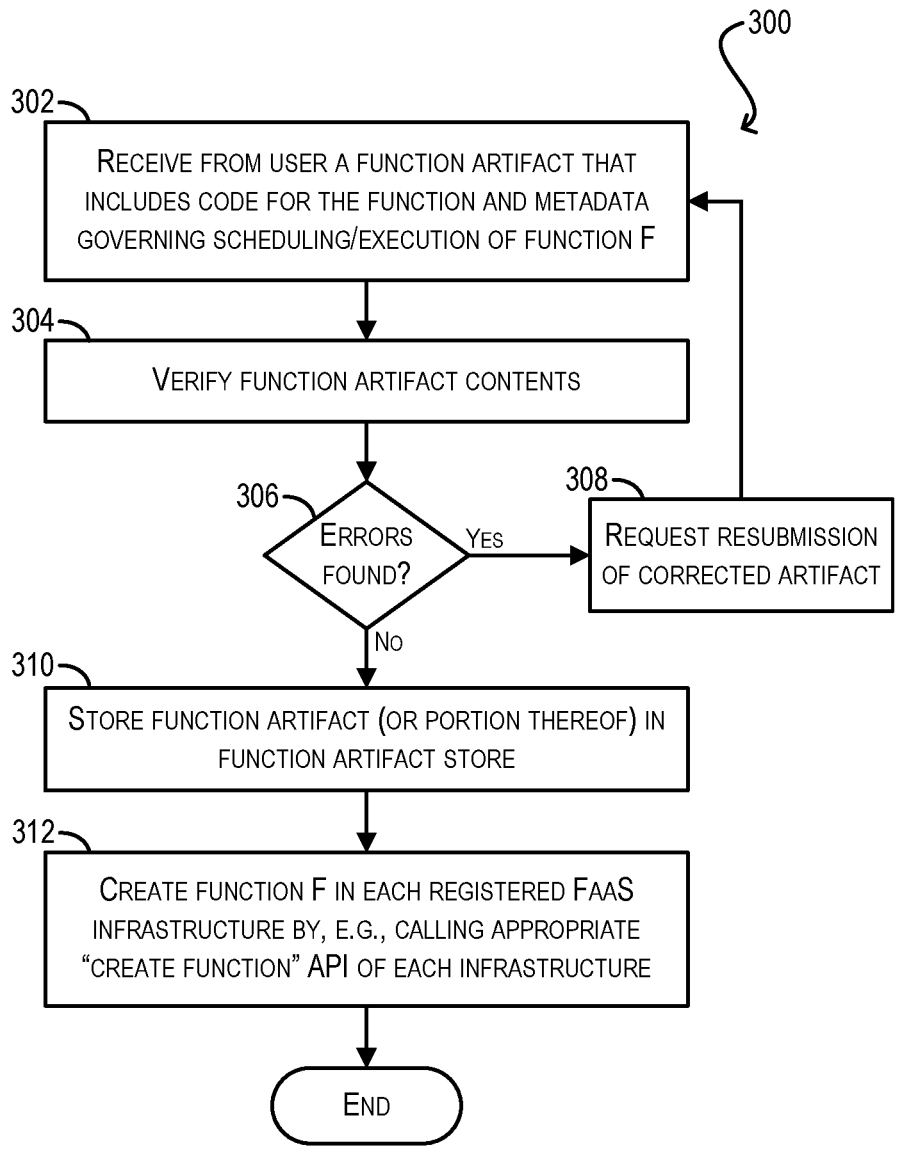
FIG. 3 depicts a workflow for uploading functions to the spanning FaaS service platform according to an embodiment

Workflows for implementing the various processes described above are presented in the sections that follow. It should be appreciated that architecture 200 of FIG. 2 is illustrative and not intended to limit embodiments of the present disclosure. For example, although FIG. 2 depicts a particular arrangement of entities/components in architecture 200, other arrangements or configurations are possible depending on the specific deployment. Further, the various entities/components shown may have subcomponents or functions that are not specifically described. One of ordinary skill in the art will recognize other variations, modifications, and alternatives 3. Function Upload Workflow FIG. 3 depicts a workflow 300 that can be executed by upload component 206 of FIG. 2 for enabling the upload of a function F to spanning FaaS service platform 202 according to an embodiment. Upload component 206 can be implemented in a number of ways, such as in the form of a self-service graphical user interface (GUI) (e.g., a web-based or mobile application), a command-line interface (CLI), or a programmatic API.

Starting with block 302, upload component 206 can receive from a user (e.g., application developer) a function artifact that includes, among other things, the code for function F and metadata defining criteria, constraints, policies, tags, and/or other information for governing the scheduling and execution of F. Merely by way of example, the metadata can include:

a whitelist of FaaS infrastructures on which function F may be run a blacklist of FaaS infrastructures on which function F may not be run a preference or requirement that F be run on a host with a particular type of hardware device or support for a particular hardware feature a preference or requirement pertaining to function execution time a preference or requirement pertaining to function execution cost a preference or requirement pertaining to data locality of data accessed by F a preference or requirement pertaining to infrastructure capacity (e.g., only run on infrastructures that are currently below a capacity usage threshold)

a preference or requirement that F be run on a certain type of FaaS infrastructure (e.g., private cloud or public cloud)

As mentioned previously, the specific format and content of this metadata can be specified by the administrators of spanning FaaS service platform 202.

At block 304, upload component 206 can verify the contents of the function artifact to ensure that it is complete and is formatted correctly. If any errors are detected at this step (block 306), upload component 206 can request that the user resubmit that function artifact with appropriate corrections (block 308) and can return to block 302.

Upon verifying the function artifact and determining that it is valid, upload component 206 can store the artifact (or a specific portion thereof, such as the function metadata), in function artifact store 212 (block 310). This stored data will later be used by spanning FaaS scheduler 210 to select an appropriate FaaS infrastructure for executing the function.

Finally, at block 312, upload component 206 can create the function in each of registered FaaS infrastructures 204(1)-(M) by calling a "create function" API exposed by the service layer of the infrastructure. Upload component 206 can determine the specifics of this API (e.g., API name, expected parameters, etc.) by referencing the FaaS driver mapped to the infrastructure. In various embodiments, the end result of this step is the creation of a function runtime image for function F in the FaaS image repository of each FaaS infrastructure 204.

4. Function Scheduling Workflow

Figure 4:
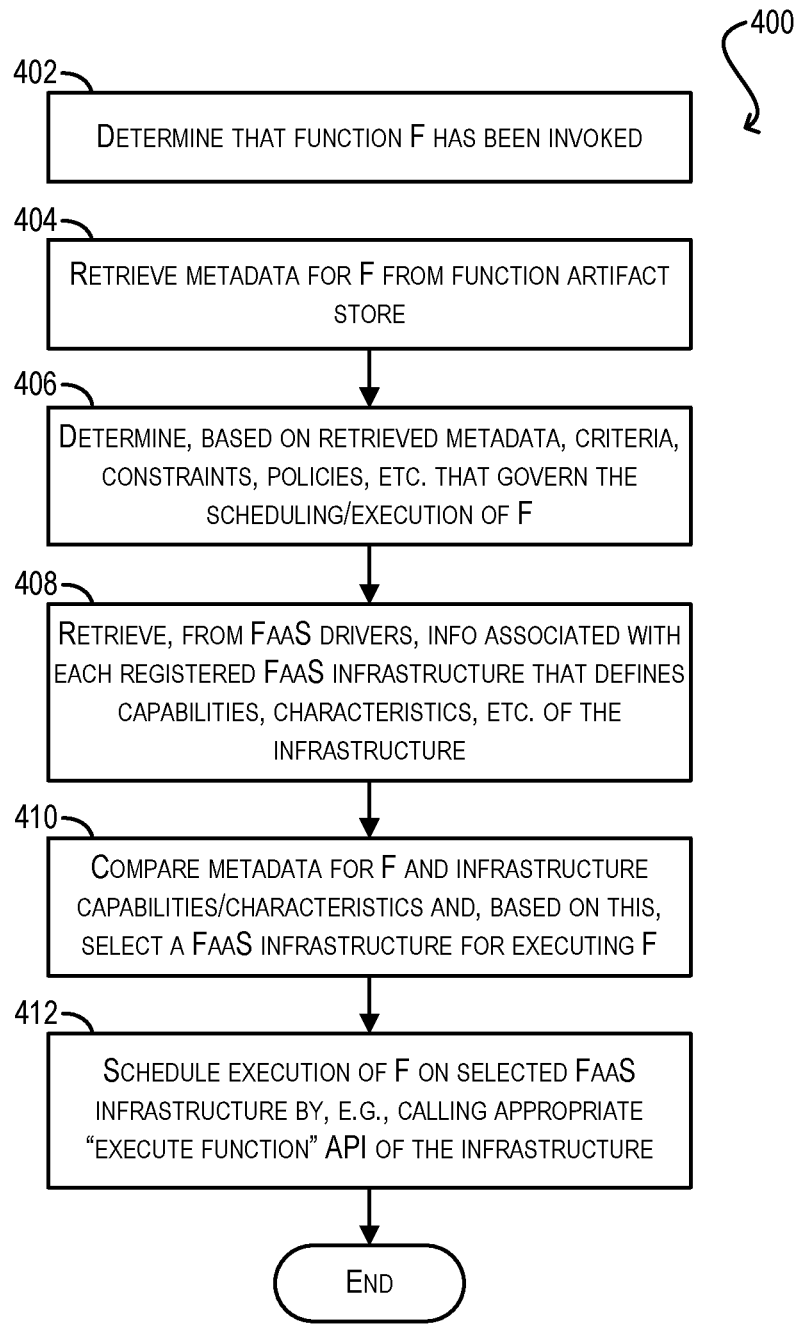
FIG. 4 depicts a workflow for scheduling functions via the spanning FaaS service platform according to an embodiment.

FIG. 4 depicts a workflow 400 that can be executed by spanning FaaS scheduler 210 of FIG. 2 for scheduling the execution of a function F on one of FaaS infrastructures 204(1)-(M) according to an embodiment. Workflow 400 assumes that the function artifact for F has been uploaded to spanning FaaS service platform 202 and runtime images for F have been created in each FaaS infrastructure 204 per workflow 300 of FIG. 3.

Starting with block 402, spanning FaaS scheduler 210 can determine that function F has been invoked. Scheduler 210 can make this determination by, e.g., receiving an explicit invocation request or by detecting the occurrence of an event that is known to trigger the invocation of F.

At blocks 404 and 406, spanning FaaS scheduler 210 can retrieve the function metadata for F from function artifact store 212 and can determine, from the retrieved metadata, the various criteria, constraints, and/or policies that govern the scheduling of F. In addition, spanning FaaS scheduler 210 can retrieve the information associated with each registered FaaS infrastructure 204 that defines various capabilities/characteristics of the infrastructure (e.g., infrastructure type (private or public), hardware capabilities, billing model, geographic locations of server resources/data centers, capacity constraints, etc.) (block 408). Spanning FaaS scheduler 210 can retrieve this infrastructure information from respective FaaS drivers 208(1)-(M).

At block 410, spanning FaaS scheduler 210 can compare the criteria/constraints/policies determined at block 406 and the infrastructure information retrieved at block 408 and, based on these comparisons, can select a FaaS infrastructure (from among the registered infrastructures) that scheduler 210 deems is best suited for executing the function. The exact nature of the selection logic applied at this step may differ depending on the entity deploying spanning FaaS service platform 202, since different organizations may have different views regarding how to prioritize certain criteria in order to arrive at a final decision. In some embodiments, spanning FaaS scheduler 210 can be built in a modular fashion so that its selection logic can be easily changed for different deployments. However, the general idea is that scheduler 210 will select a FaaS infrastructure that satisfies or conforms to the majority of the criteria/constraints/policies specified for the function.

The following is a sample list of criteria/constraints/policies that may be taken into account by scheduler 210. This list is non-exhaustive and one of ordinary skill in the art will recognize that other types of criteria/constraints/policies are possible.

- Schedule the function on an infrastructure having hardware capability or device X
- Schedule the function on an infrastructure that results in the lowest monetary cost
- Schedule the function on an on-premise infrastructure if there is available capacity; otherwise, schedule the function on a public cloud infrastructure that results in the lowest monetary cost
- Do not schedule the function on a public cloud infrastructure where the usage of that infrastructure (in terms of, e.g., number of function invocations, total execution time, etc.) has exceeded a threshold T
- Schedule the function on a public cloud infrastructure with data centers closest to geographic region R Finally, at block 412, spanning FaaS scheduler 210 can schedule execution of function F on the selected FaaS infrastructure. Scheduler 210 can perform this step by calling an appropriate "execute function" API of the selected FaaS infrastructure, as determined from the infrastructure's FaaS driver. It should be noted that spanning FaaS scheduler 210 typically will not have control over which particular host of the selected FaaS infrastructure will execute the function; this host-level selection will be performed by the internal service layer of the infrastructure.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for scheduling and executing functions across different Functions-as-a-Service (FaaS) infrastructures, the method comprising:
   receiving, by a computer system, a function artifact including program code and metadata for a function, the metadata defining criteria or policies pertaining to scheduling or execution of the function;
   creating, by the computer system, the function in each FaaS infrastructure of a plurality of FaaS infrastructures registered with the computer system, wherein said each FaaS infrastructure comprises a plurality of host systems, a service layer, and an image repository, and wherein the creating of the function in said each FaaS infrastructure comprises creating a runtime image for the function in said each FaaS infrastructure's image repository;
   determining, by a computer system, that the function has been invoked;
   retrieving, by the computer system, the metadata for the function;
   retrieving, by the computer system, information associated with each FaaS infrastructure, the information including capabilities or characteristics of said each FaaS infrastructure;
   selecting, by the computer system, a FaaS infrastructure in the plurality of FaaS infrastructures that the computer system deems best suited for executing the function based on the retrieved metadata and the retrieved information; and
   invoking, by the computer system, an application programming interface (API) exposed by a service layer of the selected FaaS infrastructure for executing the function on a host system of the selected FaaS infrastructure.

2. The method of claim 1 wherein the plurality of FaaS infrastructures include a private cloud-based FaaS infrastructure and a public cloud-based FaaS infrastructure.

3. The method of claim 1 wherein the plurality of FaaS infrastructures include a first public cloud-based FaaS infrastructure operated by a first FaaS service provider and a second public cloud-based FaaS infrastructure operated by a second FaaS service provider distinct from the first FaaS service provider.

4. The method of claim 1 wherein the metadata defines a criterion or policy indicating that the function should be scheduled for execution on a host system that includes a particular hardware device or feature.

5. The method of claim 1 wherein the metadata defines a criterion or policy indicating that that function should be scheduled for execution on a particular FaaS infrastructure that results in lowest monetary cost, provides fastest performance, or avoids going beyond a predefined capacity or usage threshold.

6. The method of claim 1 wherein the information associated with each FaaS infrastructure is included in a driver for said each FaaS infrastructure that is registered with the computer system.

7. The method of claim 6 wherein the API invoked by the computer system is defined in the driver for the selected FaaS infrastructure.

8. A non-transitory computer readable storage medium having stored thereon program code executable by a computer system, the program code embodying a method for scheduling and executing functions across different Functions-as-a-Service infrastructures, the method comprising:
   receiving a function artifact including program code and metadata for a function, the metadata defining criteria or policies pertaining to scheduling or execution of the function;
   creating the function in each FaaS infrastructure of a plurality of FaaS infrastructures registered with the computer system, wherein said each FaaS infrastructure comprises a plurality of host systems, a service layer, and an image repository, and wherein the creating of the function in said each FaaS infrastructure comprises creating a runtime image for the function in said each FaaS infrastructure's image repository;
   determining that the function has been invoked;
   retrieving the metadata for the function;
   retrieving information associated with each FaaS infrastructure, the information including capabilities or characteristics of said each FaaS infrastructure;
   selecting a FaaS infrastructure in the plurality of FaaS infrastructures that the computer system deems best suited for executing the function based on the retrieved metadata and the retrieved information; and
   invoking, by the computer system, an application programming interface (API) exposed by a service layer of the selected FaaS infrastructure for executing the function on a host system of the selected FaaS infrastructure.

9. The non-transitory computer readable storage medium of claim 8 wherein the plurality of FaaS infrastructures include a private cloud-based FaaS infrastructure and a public cloud-based FaaS infrastructure.

10. The non-transitory computer readable storage medium of claim 8 wherein the plurality of FaaS infrastructures include a first public cloud-based FaaS infrastructure operated by a first FaaS service provider and a second public cloud-based FaaS infrastructure operated by a second FaaS service provider distinct from the first FaaS service provider.

11. The non-transitory computer readable storage medium of claim 8 wherein the metadata defines a criterion or policy indicating that the function should be scheduled for execution on a host system that includes a particular hardware device or feature.

12. The non-transitory computer readable storage medium of claim 8 wherein the metadata defines a criterion or policy indicating that that function should be scheduled for execution on a particular FaaS infrastructure that results in lowest monetary cost, provides fastest performance, or avoids going beyond a predefined capacity or usage threshold.

13. The non-transitory computer readable storage medium of claim 8 wherein the information associated with each FaaS infrastructure is included in a driver for said each FaaS infrastructure that is registered with the computer system.

14. The non-transitory computer readable storage medium of claim 13 wherein the API invoked by the computer system is defined in the driver for the selected FaaS infrastructure.

15. A computer system comprising:
a processor; and
a non-transitory computer readable medium having stored thereon program code that, when executed by the processor, causes the processor to:
receive a function artifact including program code and metadata for a function, the metadata defining criteria or policies pertaining to scheduling or execution of the function;
create the function in each FaaS infrastructure of a plurality of FaaS infrastructures registered with the computer system, wherein said each FaaS infrastructure comprises a plurality of host systems, a service layer, and an image repository, and wherein the creating of the function in said each FaaS infrastructure comprises creating a runtime image for the function in said each FaaS infrastructure's image repository;
determine that the function has been invoked;
retrieve the metadata for the function;
retrieve information associated with each FaaS infrastructure, the information including capabilities or characteristics of said each FaaS infrastructure;
select a FaaS infrastructure in the plurality of FaaS infrastructures that the processor deems best suited for executing the function based on the retrieved metadata and the retrieved information; and
invoke an application programming interface (API) exposed by a service layer of the selected FaaS infrastructure for executing the function on a host system of the selected FaaS infrastructure.

16. The computer system of claim 15 wherein the plurality of FaaS infrastructures include a private cloud-based FaaS infrastructure and a public cloud-based FaaS infrastructure.

17. The computer system of claim 15 wherein the plurality of FaaS infrastructures include a first public cloud-based FaaS infrastructure operated by a first FaaS service provider and a second public cloud-based FaaS infrastructure operated by a second FaaS service provider distinct from the first FaaS service provider.

18. The computer system of claim 15 wherein the metadata defines a criterion or policy indicating that the function should be scheduled for execution on a host system that includes a particular hardware device or feature.

19. The computer system of claim 15 wherein the metadata defines a criterion or policy indicating that that function should be scheduled for execution on a particular FaaS infrastructure that results in lowest monetary cost, provides fastest performance, or avoids going beyond a predefined capacity or usage threshold.

20. The computer system of claim 15 wherein the information associated with each FaaS infrastructure is included in a driver for said each FaaS infrastructure that is registered with the computer system.

21. The computer system of claim 20 wherein the API invoked by the processor is defined in the driver for the selected FaaS infrastructure.

* * * * *